United States Patent Office 2,920,087
Patented Jan. 5, 1960

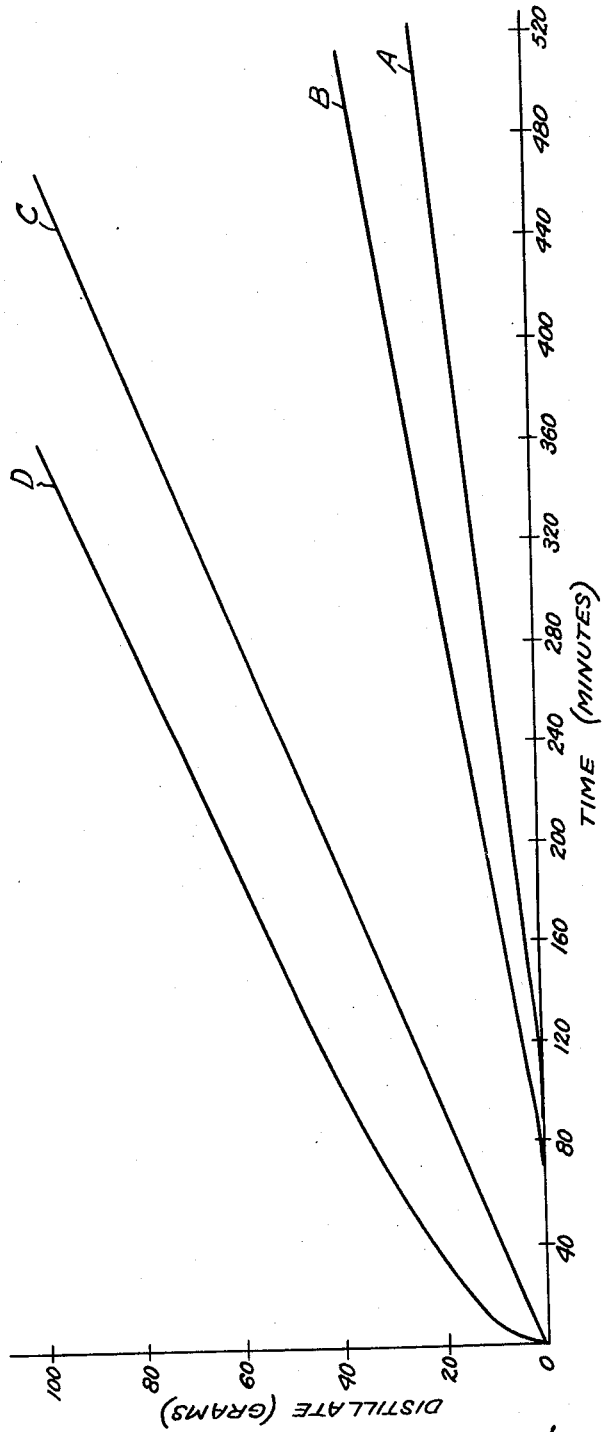

2,920,087

OXIDATION OF HYDROCARBONS AND CARBONYL COMPOUNDS

Allan S. Hay, Watervliet, N.Y., assignor to General Electric Company, a corporation of New York Application February 25, 1957, Serial No. 642,023

9 Claims. (Cl. 260—406)

This invention relates to the oxidation of aliphatic and cycloaliphatic hydrocarbon compounds and aliphatic and cycloaliphatic carbonyl-containing compounds (hereinafter referred to generally as "alkyl compounds"). More particularly, this invention relates to a process of preparing oxygenated alkyl compounds which comprises reacting an alkyl compound with oxygen as an oxidizing agent in the presence of a catalyst soluble in the reaction mixture and consisting essentially of cobalt, bromine and a carboxylic acid.

Heretofore, cobalt salts, such as cobalt acetate, have been employed as catalysts in the oxidation of alkyl compounds using oxygen as the oxidizing agent. However, the cobalt acetate process suffers from the fact that its reaction rates are relatively slow.

Unexpectedly, I have now discovered a general method whereby alkyl and cycloalkyl hydrocarbons, esters, acids, ketones and the like can be rapidly oxidized with oxygen or air to form oxygenated products. This process, which occurs under moderate reaction conditions, comprises reacting these compounds in a liquid phase with oxygen in the presence of a catalyst soluble in the reaction mixture and consisting essentially of cobalt, bromine and a carboxylic acid. The catalyst for this reaction is so unique and specific that the omission of bromine or the substitution of other closely related components, such as copper for cobalt, or chlorine or iodine for bromine renders the catalyst inactive or no more reactive than cobalt acetate alone.

The features of this invention desired to be protected herein are pointed out with particularity in the appended claims. The invention itself may best be understood by reference to the following description taken in conjunction with the accompanying drawing which is a graph wherein parts by weight of water-containing distillate from the reaction mixture is plotted as a function of oxidation time in minutes. Curves A and B represent the oxidation of n-octane employing cobalt acetate as the catalyst. Curves C and D represent the oxidation of n-octane employing the catalyst of this invention.

In carrying out the process of the present invention, the alkyl compound alone or with a suitable inert solvent having little water solubility and/or from which water can be rapidly removed by distillation and the catalyst containing cobalt, bromine, and a carboxylic acid (also referred to as the "cobalt-bromine-carboxylic catalyst" or "catalyst") are added to a suitable reaction vessel and heated to reaction temperature. Oxygen is then passed into the reaction mixture at the desired rate for the desired period of time. After the reaction is completed, the oxygenated products are then separated from the reaction mixture by conventional methods. The process can also be carried out in a continuous manner by continuously adding both alkyl compound and oxygen to a solution of the cobalt-bromine-carboxylic catalyst. Alternately, a part of the catalyst can be present in one part of the system while the other part of the catalyst is added with a reactant. Thus, cobalt acetate can be present in the solvent and bromine added with the alkyl compound. By reusing the mother liquid of a prior run in a subsequent run, one can continuously reuse the catalyst.

The term "alkyl compounds" as used in the present invention refers to aliphatic or cycloaliphatic compounds which are totally hydrocarbon as well as aliphatic or cycloaliphatic compounds which contain carbonyl groups, for example, acids, esters, ketones and the like groups. The term includes compounds of the formula R—X where R is an alkyl radical, for example, methyl, ethyl, propyl, butyl, pentyl, hexyl, heptyl, octyl, nonyl, decyl, octadecyl, and isomers and homologues thereof; cycloalkyl radicals, for example, cyclopropyl, cyclobutyl, cyclopentyl, cyclohexyl, cycloheptyl, and isomers and homologues thereof; and X is, for example, hydrogen, an acid radical, an ester radical, a keto radical, and the like.

Thus, the term is seen to include aliphatic hydrocarbons, for example, methane, ethane, propane, butane, pentane, hexane, heptane, octane, nonane, decane, undecane, dodecane, octadecane, and other members of the homologous series and isomers thereof, as well as natural or synthetic hydrocarbon mixtures, such as petroleum, kerosene, etc.; alkanoic acids, for example, acetic, propionic, butyric, caproic, caprylic, decanoic, hexadecanoic, octadecanoic acids, isomers and homologues thereof; esters thereof, for example, esters prepared from alkyl alcohols; ketones, for example, the various isomers of propanone, butanone, pentanone, octanone, decanone, dodecanone, octadecanone, etc. In addition, the term includes the above compounds containing mixed or polyfunctional groups, for example, diacids, diesters, ester-acids, acid-ketones, etc. These compounds can be oxidized by the present invention to a wide variety of oxygenated products such as, esters, acids, ketones, etc. depending on the particular compound oxidized.

Although I do not wish to be bound by theory, it is believed that cobalt, bromine and carboxylic acid combine in some unusual manner to produce the unique catalyst of this invention. All of these components are essential to produce an active catalyst. The combination is so unique that the substitution of other elements for one or more components either totally stops or substantially impedes the reaction. Thus, little catalytic action is obtained when appreciable amounts of other elements which usually make excellent oxidation catalysts are present during the reaction. For example, the presence of appreciable amounts of iron, copper, etc. in the reaction mixture substantially stops the reaction. Similarly, the presence of appreciable amounts of anions, such as sulfate, nitrate, chlorate, etc. ions inhibit the activity of this unique catalyst. The substitution of other halogens, such as chlorine for bromine, imparts to the catalyst no appreciably greater catalytic activity than is found in cobalt acetate, one of the usual prior art catalysts. The presence of iodine completely inactivates the catalyst.

The molar ratio of cobalt to bromine, calculated as monatomic bromine (Br, atomic wgt. 79.916), more frequently called the atomic ratio, is important for maximum reaction rates. Optimum reaction rates are obtained when cobalt and bromine are present in substantially equiatomic amounts (i.e. 0.9–1.1 atoms of bromine per atom of cobalt). The rate of reaction decreases rapidly as the bromine-to-cobalt atomic ratio is increased, and conversely, as the bromine-to-cobalt atomic ratio is decreased from unity, there is a decrease in activity although this decrease is less marked. I have found that a bromine-to-cobalt atomic ratio of 2 substantially stops the reaction and that the reaction proceeds at a slow rate even at as low a ratio as 0.008. Although in practice I prefer to employ bromine-to-cobalt atomic ratios of about 0.3 to 1, ratios of 0.1 to 1.2 give satisfactory results. However, atomic ratios of 0.008 to 1.9 can also be used.

Under the anhydrous conditions of this reaction, it was unexpectedly discovered that where the bromine-to-cobalt atomic ratio is greater than 2, bromine will be evolved from the heated reaction mixture until the bromine-to-cobalt atomic ratio falls below 2, at which time rapid oxidation will occur. Thus, where n-octane is oxidized employing the catalyst of this invention in a bromine-to-cobalt ratio of 4, there will be a delay in reaction until the atomic ratio falls below 2 whereupon rapid oxidation will occur. Moreover, even where an initial bromine-to-cobalt atomic ratio of slightly less than 2 is employed, bromine losses may occur during the reaction or during a continuous or a multi-cycle reaction wherein the mother liquor is continuously reused, so as to permit the further addition of more bromine, if desired. However, the catalytically effective ratio should not exceed 2.

The molar ratio of the carboxylic acid-to-cobalt has no upper limit with the result that carboxylic acids can be employed as solvents for the reaction, provided these acids have little water solubility. Although small amounts of carboxylic acids can be used to effect oxidation, for example, in a molar ratio of about 2:1 in respect to cobalt, for optimum yields and rates, it is preferable to employ larger amounts of carboxylic acid. However, where large amounts of acids are employed in solvent quantities, they should be those acids in which water is but slightly soluble and/or from which water can be very rapidly removed by distillation.

The cobalt portion of the catalyst is furnished by cobalt compounds in the divalent or trivalent state. Specific compounds include cobalt salts of carboxylic acids and cobalt bromide. Therefore, any cobalt salt of the type described which is soluble in the solvent employed in an amount sufficient to form the catalyst is satisfactory for the process. The preferred source of cobalt is cobaltous acetate tetrahydrate (also referred to as "$Co(OAc)_2 \cdot 4H_2O$"). However, other suitable cobalt catalysts include the cobaltous salts of other lower aliphatic acids, such as, for example, cobaltous propionate, cobaltous butyrate, etc. In addition, cobaltous salts of aromatic carboxylic acids may also be employed as catalysts. Thus, I can employ salts such as cobaltous benzoate, cobaltous toluate, cobaltous terephthalate, cobaltous naphthenate, etc. Cobalt salts of anions that inactivate the catalyst should be avoided, for example, cobalt salts containing sulfate, nitrate, iodide, iodate, chlorate, etc. ions.

The bromine portion of the catalyst is generally furnished by bromine compounds containing bromine capable of being readily removed from the parent compound. Specific compounds include the bromocarboxylic acids, for example, the bromoaliphatic acids, e.g., the bromoacetic acids, the bromopropionic acids, the bromobutyric acids, etc., cycloaliphatic carboxylic acids containing removable bromine, for example α-bromocyclohexanecarboxylic acid, etc.; free bromine (i.e. $Br_2$); bromocarbons containing bromine capable of being readily removed from the parent compound, for example, bromochloroform, etc.; hydrogen bromide, cobalt bromide, etc. I have found that one mole of HBr per mole of cobalt acetate produces an extremely active catalyst.

The carboxylic acid portion of the catalyst is generally furnished by carboxylic acids or salts of carboxylic acids. Examples of carboxylic acids and salts comprise those carboxylic acids hereinafter mentioned as solvents and the previously mentioned cobalt salts containing carboxylate groups. Other sources of the carboxylic portion comprise compounds capable of forming carboxylic acids in situ even in very small amounts.

In the oxidation of alkyl compounds according to this invention, one of the products of reaction is water. In carrying out the reaction, it is found that the presence of a large amount of water has an adverse effect on the rate of reaction. Although the oxidation of alkyl alcohols, ethers, and acetals described in application Serial No. 641,844, filed concurrently herewith, will tolerate about 0.05 part by weight of water per part of solvent before the reaction substantially stops, it was unexpectedly discovered that the oxidation of the alkyl compounds of this invention will tolerate only about 0.02 part by weight of water per part of solvent before reaction substantially stops. Thus, the percent of water present in the reaction mixture is critical. The removal of water during the reaction is readily accomplished by allowing the water to distill from the reaction mixture as it is formed. Azeotroping agents which are inert to the reaction, for example benzene, can also be used in removing water from the reaction mixture. In some instances, the compound oxidized can act as its own azeotroping agent. Another method of keeping the water content of the reaction mixture low is to use a solvent in which very little water will dissolve and/or from which water can be very rapidly removed by distillation. Thus, hydrocarbons, such as benzene, or the reactant themselves which are characterized by little water solubility can be used. Thus, aliphatic hydrocarbons such as hexane, decane, high molecular weight acids, and the like are admirably suited to act as their own solvents.

In contrast to the oxidation of aliphatic alcohols, ethers, and acetals described in the above-mentioned application in which a wide variety of solvents may be employed, it was unexpectedly discovered that the choice of solvent in the present process is more restricted. Because water is continuously produced during the reaction and the reaction will tolerate relatively small amounts of water, it is important that its concentration be kept at a maximum of about 2%, more advantageously below 1%, based on weight of solvent, but preferably under substantially anhydrous conditions. Solvents in which water is appreciably soluble are generally unsatisfactory since it is difficult to keep their water concentration below this amount unless these solvents have such a high boiling point that the water formed can be removed substantially as fast as it is formed. Therefore, an inert solvent having little water solubility, for example less than 5% by weight at room temperature, but preferably less than 2%, should be employed, for example a hydrocarbon solvent such as benzene. A most satisfactory method of carrying out the reaction is to use the material to be oxidized as its own solvent, particularly when it has little water solubility. When water is appreciably soluble in the material to be oxidized, as in the case of acetic and propionic acids, it is necessary to use an inert solvent having little water solubility to effectively oxidize these compounds. However, higher acids, for example stearic acid, can be oxidized without solvents since their water solubility is low.

In contrast to the broad temperature range employed in the oxidation of aliphatic alcohols, ethers, and acetals described in the above-mentioned application, the oxidation of the present invention requires the use of higher temperatures. Thus, temperatures of 80–200° C. or higher but preferably 100–175° C. are required for satisfactory conversion. However, I prefer to carry out the reaction at or above the boiling point of water or the water-containing azeotrope so that water can be distilled out of the reaction mixture as fast as it is formed.

Although the process of this invention proceeds at a rapid rate at atmospheric pressure, with certain alkyl compounds, it may be desirable to employ subatmospheric or superatmospheric pressures. Because of the low boiling points of some alkyl compounds, for example the low molecular weight hydrocarbons, esters, ketones, etc., it may be desirable to increase reaction time and/or temperature by the use of superatmospheric pressure. Where products are formed which are capable of further reaction, it may be advantageous to use subatmospheric pressure to remove the products as fast as they are formed.

The rate of oxygen addition to the reaction is also not critical and may vary within any desired limits. Since the function of oxygen is to oxidize the alkyl compound, the rate of reaction is dependent to some extent on the amount of oxygen present at any given time in the reaction mixture. Thus, the rate of reaction is faster with higher rates of oxygen addition than with lower rates of addition. Satisfactory results have been obtained adding oxygen to the reaction mixture at the rate of from 0.01 to 10, and preferably from 0.5 to 5 parts by weight of oxygen per hour per part of the alkyl compound. It should be understood that in addition to employing pure oxygen as the oxidizing agent in my process, it is also possible to employ any oxygen-containing gas in which the ingredient other than oxygen is inert under the conditions of the reaction. Thus, satisfactory results have been obtained employing air instead of pure oxygen in the feed gas to the reaction. In addition, the reaction proceeds satisfactorily employing mixtures of oxygen and inert gases, such as helium, neon, xenon, krypton, argon, etc. as diluents for the oxygen in the feed gas. However, in the preferred embodiment of my invention I employ either air or oxygen as the oxidizing agent.

The catalyst will be effective in the oxidation of the alkyl compound regardless of the amount present in the reaction mixture at any given time. However, since oxidation is extremely rapid and water is a product of the reaction, a controlling factor on the rate of oxidation is the rate at which water is removed. Any amount of alkyl compound can be present during the reaction provided the water content of the reaction mixture is below 0.02 part per part of solvent. In practice, I have obtained satisfactory results when employing in the starting mixture as low as 0.01 to 0.5 part by weight of the alkyl compound per part of solvent or by using the alkyl compound as its own solvent. It is obvious that where the alkyl compound is not its own solvent, the ratio of alkyl compound to solvent will vary during the course of the reaction since the alkyl compound is being continuously oxidized. Slow addition of the alkyl compound to the reaction mixture is one method of keeping the water content low.

The following examples are illustrative of the practice of my invention and are not intended for purposes of limitation. In the examples all parts are by weight.

These examples were carried out according to the following general procedure. An alkyl compound, a solvent, if employed, and the catalyst were placed in a suitable reaction vessel which was brought to reaction temperature and stirred rapidly. At this time oxygen was passed into the reaction mixture. Water formed during the oxidation was removed from the reaction system by distillation during the course of the reaction. Specific variations from these procedures are indicated in the specific examples. In the examples the molality of bromine is calculated as monatomic bromine (Br, atomic weight 79.916). The products of this invention can be isolated by conventional techniques. The compound in the brackets ([ ]) indicates the source of the catalyst.

The following examples are presented to illustrate the superiority of the catalyst of the present invention over cobalt acetate, a catalyst of the prior art. Examples 1 and 2 employ cobalt acetate alone while Examples 3 and 4 employ the catalyst of this invention.

*Example 1*

A reaction mixture of 350 parts of n-octane and 100 parts of benzoic acid, the reaction mixture being 0.003 molal in respect to $Co(OAc)_2.4H_2O$, was heated to 118° C. as oxygen was passed in at the rate of 84 parts per hour for 8 hours. Since no reaction was observed during the first 1.5 hours, the reaction mixture was initiated with a small amount of ozone. When reaction commenced, the distillate was collected, measured and analyzed for water content at fixed intervals. During the reaction (6.5 hours) a total of 24.8 parts of distillate was collected. This distillate, which contained about 0.69 part of water per part of distillate, indicated that water was removed at the rate of 2.6 parts per hour. During reaction a total of 17.1 parts of water was removed. These results are presented in curve A of the graph.

*Example 2*

A reaction mixture of 350 parts of n-octane and 100 parts of benzoic acid, the reaction mixture being 0.13 molal in respect to $Co(OAc)_2.4H_2O$, was heated to 118° C. as oxygen at the rate of 84 parts/hour was passed into the reaction mixture for about 7 hours. An induction period was observed during the first 1.2 hours of oxygen addition since no reaction occurred during this period. When reaction commenced, the distillate was collected, measured and analyzed for water content at fixed intervals. During the reaction (5.8 hours) a total of 37.8 parts of distillate was collected. This distillate, which contained about 0.59 part of water per part of distillate indicated that water was removed at the rate of 3.8 parts per hour. During the reaction a total of 22.3 parts of water was removed. The results are presented in curve B of the graph.

*Example 3*

A reaction mixture of 350 parts of n-octane and 100 parts of benzoic acid, the reaction mixture being 0.15 molal in respect to both cobalt and bromine

[$Co(OAc)_2.4H_2O$ and $CoBr_2.6H_2O$], was heated to 118° C. as oxygen at the rate of 84 parts/hour was passed into the reaction mixture for 7.42 hours. No induction period was noted. The distillate was collected, measured and analyzed for water at fixed intervals. During reaction a total of 92.5 parts of distillate was collected. This distillate which contained about 0.68 part of water per part of distillate indicated that water was removed at the rate of 8.5 parts per hour. During the reaction a total of 63 parts of water was removed. n-Octane was converted to isomeric octanones, octanediones, octanoic acid and other carbonyl compounds. These results are presented in curve C of the graph.

*Example 4*

A reaction mixture of 300 parts of n-octane and 50 parts of caproic acid, the reaction mixture being 0.15 molal in respect to both cobalt and bromine

[$Co(OAc)_2.4H_2O$ and $CoBr_2.6H_2O$], was heated to 118° C. as oxygen at the rate of 84 parts per hour was passed into the reaction mixture for 5.75 hours. No induction period was noted. The distillate was collected, measured and analyzed for water at fixed intervals. During reaction a total of 110.5 parts of distillate was collected. This distillate which contained 0.58 part of water per part of distillate indicated that water was removed at the rate of 11.15 parts per hour. During reaction a total of 64.1 parts of water was removed. n-Octane was converted to various carbonyl compounds including isomeric octanones, octanediones, and octanoic acid. The results are presented in curve D of the graph.

The results of Examples 1 through 4 are presented in the drawing which is a graph wherein parts of distillate are plotted as a function of the time that oxygen is passed into the reaction mixture. Curve A represents Example 1; curve B, Example 2; curve C, Example 3; curve D, Example 4.

From the examples and graph, it is evident that the process of this invention (Examples 3 and 4) occurs at a very much faster rate without any induction period or external initiation. Since the water produced is derived from the oxidation process, it is evident that the rates obtained with the catalyst of this invention (Ex. 3, 8.5 parts of water/hour and Ex. 4, 11.15 parts of water per hour) are far superior to the rates obtained with cobalt acetate alone (Ex. 1, 2.6 parts of water per hour and Ex. 2, 3.8 parts of water per hour).

Example 5

This example illustrates the oxidation of a hydrocarbon using cobalt benzoate as part of the catalyst.

A reaction mixture of 100 parts of n-decane and 50 parts of benzoic acid, the reaction mixture being 0.11 molal in respect to cobalt and 0.075 molal in respect to bromine [cobaltous benzoate and $CoBr_2.6H_2O$], was heated over a temperature of 90 to 155° C. as oxygen at the rate of 84 parts/hour was passed into the reaction mixture for a period of 2 hours to yield a mixture of such carbonyl compounds including isomeric decanones, decanediones, decanoic acid.

Example 6

This example illustrates the oxidation of a lower alkanoic acid.

Two hundred parts of caproic acid, 0.15 molal in respect to cobalt and 0.1 molal in respect to bromine $$[Co(OAc)_2.4H_2O \text{ and } CoBr_2.6H_2O],$$

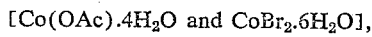

was heated over a temperature of 127° to 165° C. as oxygen at the rate of 117 parts/hour was passed into the reaction mixture for a period of 1.2 hours to yield a mixture of oxygenated products, including such keto acids and dicarboxylic acids as keto caproic, oxalic, and adiphic acids.

Example 7

This example illustrates the oxidation of a higher alkanoic acid.

Two hundred parts of stearic acid, 0.15 molal in respect to cobalt and 0.10 molal in respect to bromine $$[Co(OAc)_2.4H_2O \text{ and } CoBr_2.6H_2O],$$

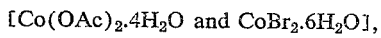

was heated over a temperature of 140 to 155° C. as oxygen at the rate of 84 parts/hour was passed into the reaction mixture for 3.3 hours to yield a mixture of oxygenated products including dicarboxylic acids and keto acids such as the isomeric ketostearic acids.

Although the foregoing examples have described a number of variations and modifications of the proportions of ingredients and reaction conditions which may be employed in the practice of the present invention, it should be understood that my reaction is also applicable to reactants, reaction conditions, and proportions of ingredients which are not specifically illustrated by the examples.

The acids and ketones prepared by the method of this invention exhibit the same utility as the same acids and ketones prepared by any other method. Thus, these acids may be esterfied to serve as plasticizers for resinous materials, such as polyvinyl chloride, polyvinyl acetate, etc. Dibasic acids prepared by my process may be reacted with polyhydric alcohols in conventional methods to form polyester resins.

The ketones prepared by my process can be used as solvents for various systems, for example, in coating, vinyl, vinyl-modified, etc. resin systems. They may also be used in the synthesis of chemicals and perfumes, as solvents for lacquers, gums, resins, nitrocellulose, etc. The mixtures prepared by the process of this invention can also be used without fractionation as solvents for lacquers, gums, resins, etc.

From the foregoing it is evident that a rapid, unique and versatile oxidation process has been described. The foregoing detailed description has been given for clearness of understanding only and no unnecessary limitations are to be understood therefrom. The invention is not limited to the exact details shown and described for obvious modifications will occur to those skilled in the art. For example, although the oxidation generally requires no external initiation from ozone, peroxides, hydroperoxides, etc., the use of these expedients is not precluded.

What I claim as new and desire to secure by Letters Patent of the United States is:

1. The process of preparing oxygenated products which comprises reacting oxygen with an organic compound selected from the group consisting of alkyl and cycloalkyl hydrocarbon compounds and alkyl and cycloalkyl carbonyl-containing compounds in a reaction mixture containing dissolved therein a catalyst consisting essentially of cobalt, bromine and a carboxylic acid, the cobalt being obtained from divalent and trivalent cobalt salts and the catalyst having a bromine to cobalt atomic ratio of 0.008 to 1.9 atoms of bromine per atom of cobalt.

2. The process of preparing oxygenated products which comprises reacting oxygen, with an organic compound selected from the group consisting of alkyl and cycloalkyl hydrocarbon compounds and alkyl and cycloalkyl carbonyl-containing compounds in a reaction mixture containing dissolved therein a catalyst consisting essentially of cobalt, bromine and a carboxylic acid, the cobalt being obtained from divalent and trivalent cobalt salts and the catalyst having a bromine to cobalt atomic ratio of 0.1 to 1.2 atoms of bromine per atom of cobalt.

3. The process of preparing oxygenated products which comprises reacting oxygen with an organic compound selected from the group consisting of alkyl and cycloalkyl hydrocarbon compounds and alkyl and cycloalkyl carbonyl-containing compounds in a reaction mixture containing dissolved therein a catalyst consisting essentially of cobalt, bromine, and a carboxylic acid, the cobalt being obtained from cobalt acetate, the bromine being obtained from a member selected from the group consisting of bromine, hydrogen bromide and cobalt bromide and said catalyst having a bromine to cobalt atomic ratio of 0.1 to 1.2 atoms of bromine per atom of cobalt.

4. The process of claim 1 in which the compound oxidized is an alkane.

5. The process of claim 4 in which the alkane is n-octane.

6. The process of claim 4 in which the alkane is n-decane.

7. The process of claim 1 in which the alkyl compound oxidized is an alkanoic acid.

8. The process of claim 7 in which the alkanoic acid is caproic acid.

9. The process of claim 7 in which the alkanoic acid is stearic acid.

No references cited.